United States Patent
Winkler et al.

(10) Patent No.: US 7,457,887 B1
(45) Date of Patent: Nov. 25, 2008

(54) METHOD AND SYSTEM FOR PROCESSING ASYNCHRONOUS EVENT NOTIFICATIONS

(75) Inventors: Christopher G. Winkler, Auburn, CA (US); Robert E. Johnson, Auburn, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 176 days.

(21) Appl. No.: 11/502,282

(22) Filed: Aug. 10, 2006

(51) Int. Cl.
*G06F 3/00* (2006.01)
*G06F 13/00* (2006.01)

(52) U.S. Cl. .............................. 710/8; 710/15; 710/19

(58) Field of Classification Search ........................ None
See application file for complete search history.

(56) References Cited

U.S. PATENT DOCUMENTS

2006/0218532 A1* 9/2006 Cordella et al. ............. 717/124

* cited by examiner

*Primary Examiner*—Tariq Hafiz
*Assistant Examiner*—Scott Sun
(74) *Attorney, Agent, or Firm*—Klein, O'Neill & Singh, LLP

(57) ABSTRACT

Method and system for managing asynchronous event notifications (AENs) including comparing an AEN sequence number at a shared memory location with an AEN sequence number at a local memory location controlled by a application; acquiring an AEN from the shared memory, if the sequence number of the AEN in the local memory is different from the sequence number of the AEN in shared memory; determining if a version number of the AEN is current; and generating an AEN if the version number is not current, wherein the generated AEN allows other applications to update AEN version numbers. The system includes firmware code executed in an adapter; an adapter driver executed on a host computing system stores the AENs in a memory buffer; and a plurality of applications that use a shared memory where AENs and a version number associated with the AENs are stored.

20 Claims, 4 Drawing Sheets

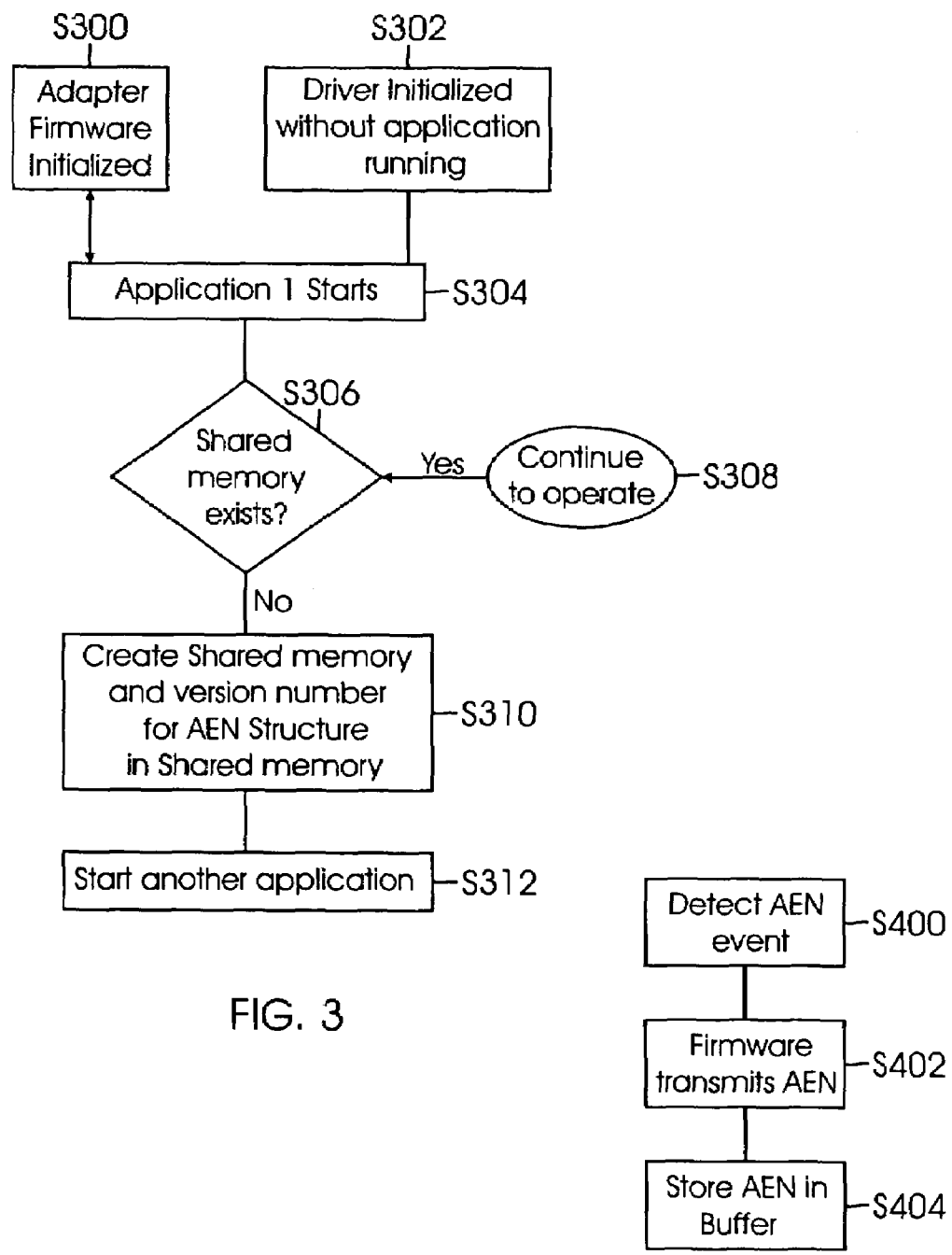

METHOD AND SYSTEM FOR PROCESSING ASYNCHRONOUS EVENT NOTIFICATIONS

BACKGROUND

1. Field of the Invention

The present invention relates to computing systems, and more particularly, to managing asynchronous event notifications ("AENs").

2. Related Art

Conventional computing systems typically include several functional components. These components may include a central processing unit (CPU), memory, input/output ("I/O") devices, and streaming storage devices (for example, tape drives). In most conventional computing systems, a memory (or main memory) may be coupled to the CPU via a system bus or a local memory bus. Generally, the memory is used to provide the CPU access to data and/or program information that is stored in the memory at execution time. Typically, the memory is composed of random access memory (RAM) circuits.

Conventional computing systems, often referred to as host systems, are used for various applications and in multiple environments, including networks, for example, storage area networks ("SANs"). Generally, a SAN is a high-speed sub-network of shared storage devices, for example, disks and tape drives. Typically, SANs are used to store and access data.

Host systems typically communicate with storage systems via a host bus adapter ("HBA", also referred to as a "controller" and/or "adapter") using an interface, for example, the "PCI" (or PCI-X/PCI-Express) bus interface.

Asynchronous event notifications are sent by HBAs or other hardware devices to notify software applications of certain events. For example, if a network cable is disconnected from a HBA, the HBA may send an AEN to all applications notifying them of the event (i.e. network cable disconnect).

The term software application as used herein includes software programs running on host systems or otherwise. Software applications may include management software used by a host system to monitor network events; diagnostic software programs used to diagnose and fix hardware/software problems; and the like.

Typically, information passed by AENs use a data structure format. The data structure format of the AEN is used by plural software applications to understand AEN content and, when needed, to respond to the AEN.

If a software application does not have the correct version of the data structure for an AEN, then the AEN information may be difficult to decipher and the software application may fail to appropriately respond. If the format of the data structure changes at any time, all software applications sharing the AENs should be upgraded so that they continue to function properly. Conventional computing systems do not provide an efficient way to upgrade software applications in conjunction with changes to AEN data structure formats.

Therefore, what is needed is a method and system for managing an AEN.

SUMMARY OF THE PRESENT INVENTION

In one aspect of the present invention, a method for managing AENs is provided. The method includes comparing an AEN sequence number at a shared memory location with an AEN sequence number at a local memory location controlled by an application; acquiring an AEN from the shared memory, if the sequence number of the AEN in the local memory is different from the sequence number of the AEN in shared memory; determining if a version number of the AEN is current; and generating an AEN if the version number is not current, wherein the generated AEN allows other applications to update AEN version numbers.

In yet another aspect, a system for managing asynchronous event notifications (AENs) is provided. The system includes firmware code executed in a adapter, wherein the firmware code generates AENs after detecting certain events; an adapter driver executed on a host computing system stores the AENs in a memory buffer; and a plurality of applications that use a shared memory where AENs and a version number associated with the AENs are stored; and when an application compares an AEN sequence number at a shared memory location with an AEN sequence number at a local memory location controlled by the application; acquires an AEN from the shared memory, if the sequence number of the AEN in the local memory is different from the sequence number of the AEN in shared memory; determines if a version number of the AEN is current; and generates an AEN if the version number is not current, wherein the generated AEN allows other applications to update AEN version numbers.

This brief summary has been provided so that the nature of the invention may be understood quickly. A more complete understanding of the invention can be obtained by reference to the following detailed description of the other embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIG. 3 shows a process flow diagram for creating shared memory, according to one aspect of the present invention;

FIG. 4 shows a process flow diagram for generating an AEN, according to one aspect of the present invention.

DETAILED DESCRIPTION

To facilitate an understanding of the various adaptive aspects of the present invention, the general architecture and operation of a system using a HBA is described. The specific architecture and operation of the other embodiments are described with reference to the general architecture.

Figure 1:
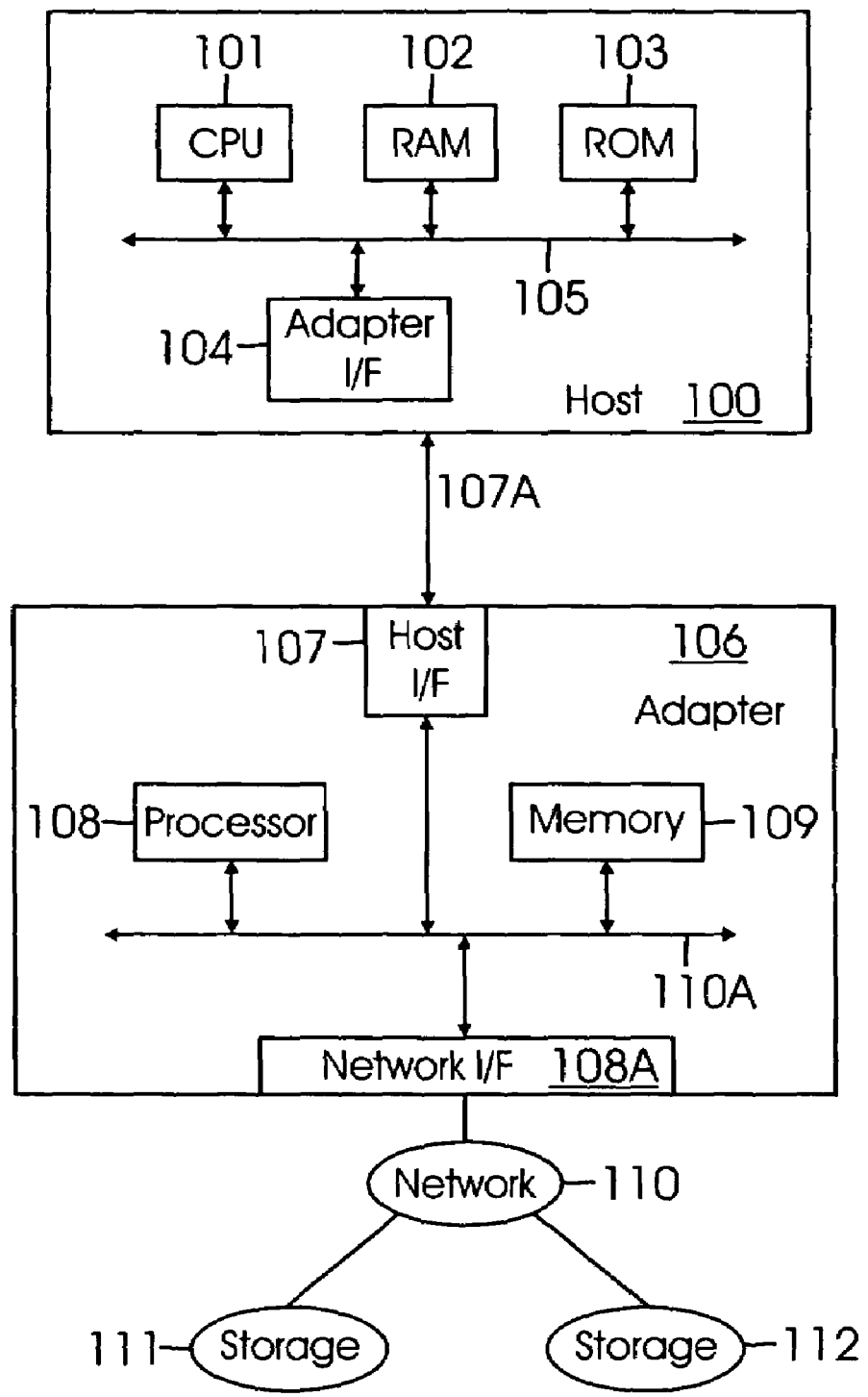
FIG. 1 shows a top-level block diagram of a system using a HBA, according to one aspect of the present invention.

FIG. 1 shows a block diagram of a host computing system 100 (also referred to as "host system") having a central processing unit 101 that executes program instructions out of memory 102 that may be random access memory (RAM). Read only memory (ROM) 103 is also provided to store invariant instruction sequences, such as start-up instruction sequences or basic input/output operating system (BIOS).

Host computing system 100 interfaces with HBA 106 using an adapter interface 104 and bus 107A. Bus 107A may be a PCI, PCI-X, PCI-Express or any other standard/non-standard bus. The standard bus specifications are incorporated herein by reference in their entirety.

In one embodiment, HBA 106 is used to interface host-computing system 100 with storage sub-systems 111 and 112 via a network 110 for example, a SAN. (SAN is used interchangeably for network throughout this specification).

HBA 106 includes host interface 107 that is used to interface with host computing system 100. In one aspect, host interface 107 may be a PCI, PCI-X-PCI-Express based interface. HBA 106 interacts with network 110 via a network interface 108A. The structure/configuration of interface 108A will depend on the protocols/networks standards (for example, Fibre Channel, Ethernet, InfiniBand and others).

HBA 106 also includes a processor 108 for executing software instructions out of memory 109 (via bus 110A). These software instructions are referred to as "firmware" (213, FIG. 2). Processor 108 may be a reduced instruction set computer (RISC) or any other processor.

Figure 2:
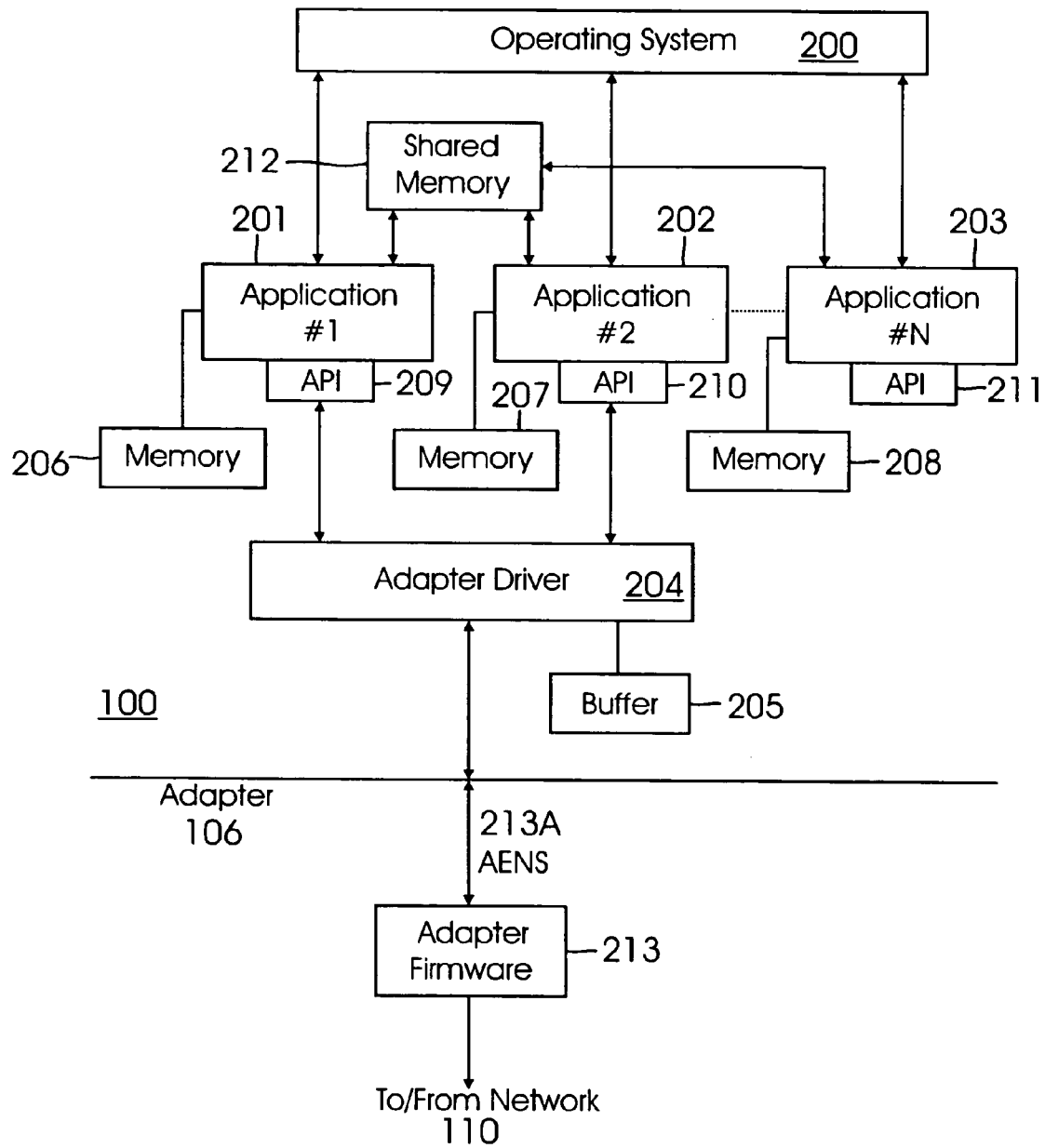
FIG. 2 shows top-level software architecture used according to one aspect of the present invention.

FIG. 2 shows a block diagram of an embodiment of the overall software architecture that allows host computing system 100 to interface with various networked devices via HBA 106. Host computing system 100 may use any suitable operating system 200, for example, Windows® or Linux based operating systems, to control overall operation of host computing system 100.

Plural software applications, such as Application #1 (201), Application #2 (202) . . . Application #n (203), may be running on host computing system 100 or plural host computing systems. Each software application 201, 202 and 203 has an application programming interface (API) 209, 210 and 211 that interfaces with driver 204. Driver 204 is used by host computing system 100 to interface with HBA 106.

In one embodiment, each software application 201, 202, and 203 has local memory, for example, local memory 206, 207 and 208, that is allocated by operating system 200. Local memory 206, 207 and 208 may be used by each corresponding software application 201, 202 and 203 to store data and commands. Local memory 206, 207 and 208 may be part of memory 102 (FIG. 1).

Shared memory 212, which may also be part of memory 102, may be used as a shared resource by the plural software applications. Shared memory 212 may be used by individual software applications to store AENs and their corresponding sequence/version numbers.

Driver 204 uses a memory buffer 205 to store the AENs, such as AENs 213A, that are received from HBA firmware 213.

In one embodiment, the AENs are pre-defined and are generated for specific events. The AENs may be issued in a sequence and each AEN has a sequence number. For example, an AEN issued at time t1, may have a sequence number [0001]; the next AEN may have a sequence number of [0002] and so forth. The sequence number is created by the software application that retrieves the AEN from driver 204.

The AENs also have a version number that is based on the data structure of the AENs as stored in shared memory 212. Software Applications 201, 202 and 203 regularly poll driver 204 and check shared memory 212 to acquire the AENs.

Figure 5:
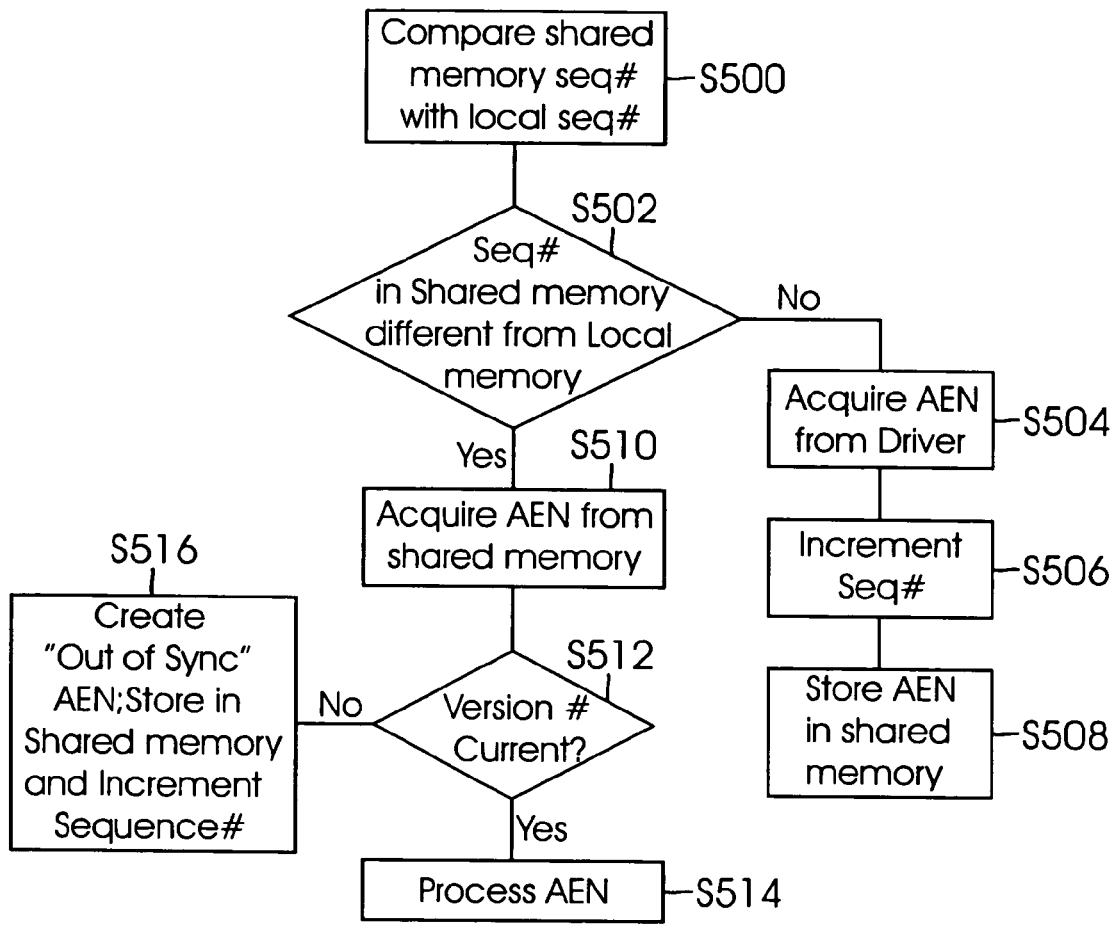
FIG. 5 shows a flow diagram for managing AEN version numbers, according to one aspect of the present invention.

The process for generating and managing the AENs, according to embodiments of the present invention is now described with respect to the process flow diagrams of FIGS. 3-5.

FIG. 3 shows a process flow diagram for establishing shared memory/version numbers, according to one embodiment of the present invention. In step S300, firmware 213 is initialized; and in step S302, driver 204 is initialized. During steps S300 and S302, no software applications are running.

In step S304, a software application is initialized, for example, software application 201 is initialized. In step S306, software application 201 queries operating system 200 to determine if shared memory exists. If shared memory 212 exists, then software application 201 "attaches" (i.e. interfaces) to shared memory 212, which allows access to software application 201, and the process continues.

In step S306, if upon query shared memory 212 is determined not to exist, then in step S310, software application 201 creates shared memory 212 (based on operating system 200, approval). Software application 201 also stores a version number in shared memory 212 that denotes the data structure for AENs 213A. Thereafter, in step S312, other software applications (for example, software applications 202, and 203) begin to operate.

FIG. 4 shows a process flow diagram for generating the AENs, according to one embodiment of the present invention. In step S400, HBA 106 detects an AEN event. An AEN event is typically pre-programmed by processor 108 (FIG. 1). For example, a network cable disconnect may be one such event. It should be understood that any event may be programmed as an AEN event.

In step S402, HBA 106, through firmware 213, sends the AEN event to driver 204. In step S404, driver 204 stores the AEN event in buffer 205.

FIG. 5 shows a process flow diagram for managing AENs, according to one embodiment of the present invention. In step S500, an application, for example, software application 201, polls shared memory 212 to compare an AEN sequence number as stored in shared memory 212 with a sequence number stored in a local memory, such as local memory 206.

If the sequence number is the same, then in step S504, software application 201 polls driver 204 for the AENs. Software application 201 then acquires the AENs stored in buffer 205.

In step S506, software application 201 increments the AEN sequence number and maintains the sequence number to ensure that it has the latest AEN. Thereafter, in step S508, the AEN is stored in shared memory 212.

If in step S502, the sequence number in shared memory 212 is different from the sequence number in local memory 206, then, in step S510, software application 201 acquires the AEN from shared memory 212.

In step S512, software application 201 compares the version number for the AEN with a current version number. If the version numbers do not match, in step S516, software application 201 creates an "out of sync" AEN message and stores it in shared memory 212. Thereafter, software application 201 increments the sequence number. In one embodiment, a flag is set in shared memory 212 and an Out of Sync AEN message is sent to all software applications, so that the software applications can inform a user that a software application should be upgraded. Once the software applications upgrade is complete all the software applications have consistent data structures and thus, the AENs can be processed correctly.

In step S514, if the version number in step S512 is current, then software application 201 performs the task in response to the AEN.

It should be understood that reference in the embodiments described herein to software application 201 is done simply to illustrate the process steps of the present invention, but that the present invention is not limited to any particular type of software application. Furthermore, the adaptive aspects of the present invention are not limited to a HBA, and any device that is generating AENs shared between plural software applications can benefit from the foregoing approach.

In one embodiment of the present invention, by generating an out of sync AEN message, different applications can inform the user that a software application should be upgraded and hence maintain AEN data structure consistency within the shared memory resource where AENs are stored.

Although the present invention has been described with reference to specific embodiments, these embodiments are illustrative only and not limiting. Many other applications and embodiments of the present invention will be apparent in light of this disclosure and the following claims.

What is claimed is:

1. A method for managing asynchronous event notifications (AENs) for a plurality of applications, comprising:
    providing a plurality of applications, all of the plurality of applications polling a shared memory and each application accessing a local memory;
    comparing by an application, an AEN sequence number stored at a shared memory location of the shared memory with an AEN sequence number at a local memory location of the local memory of the application;
    acquiring by the application, an AEN from the shared memory, if the sequence number of the AEN in the local memory is different from the sequence number of the AEN in shared memory;
    determining by the application if a version number of the acquired AEN is current; and if the version number is not current, the application generating an AEN instructing other applications to perform an AEN version number update.

2. The method of claim 1, further comprising increasing an AEN sequence number after the AEN is generated by the application.

3. The method of claim 1, further comprising acquiring by the application, an AEN from a memory buffer controlled by an adapter driver if the sequence number of the AEN in shared memory and the sequence number for the AEN in local memory is the same.

4. The method of claim 3, further comprising increasing an AEN sequence number after the AEN is acquired.

5. The method of claim 4, wherein the AEN is stored in shared memory.

6. The method of claim 1, wherein AENs and AEN version number are stored in shared memory.

7. The method of claim 1, wherein the applications are executed by a host system.

8. The method of claim 1, further comprising generating AENs in response to certain pre-programmed events using an HBA.

9. The method of claim 1, further comprising generating AENs in response to certain pre-defined events using a network adapter.

10. A system for managing asynchronous event notifications (AENs) for a plurality of applications, comprising:
    a host computing system;
    an adapter;
    firmware code executed in the adapter, for generating AENs after detecting certain events;
    an adapter driver executed on the host computing system to store the generated AENs in a memory buffer; and
    a plurality of applications that poll a shared memory where AENs and a version number associated with the AENs are stored; each of the plurality of applications using a local memory; and
    wherein one of the plurality of the applications (i) compares an AEN sequence number at a shared memory location of the shared memory with an AEN sequence number at a local memory location of the local memory used by the application; (ii) acquires an AEN from the shared memory, if the sequence number of the AEN in the local memory is different from the sequence number of the AEN in shared memory; (iii) determines if a version number of the AEN is current, the version number indicative of the data structure of the AEN; and (iv) generates an AEN if the version number is not current, wherein the generated AEN allows other applications to update AEN version numbers.

11. The system of claim 10, wherein an AEN sequence number is increased by the application, after the AEN is generated.

12. The system of claim 10, wherein if sequence number of the AEN in shared memory and the sequence number for the AEN in local memory is same, then the application acquires the AEN stored in the memory buffer by the adapter driver.

13. The system of claim 12, wherein the application increases an AEN sequence number after the AEN is acquired.

14. The system of claim 13, wherein the AEN is stored in the shared memory.

15. The system of claim 10, wherein the shared memory is used to store AENs and AEN version number.

16. The system of claim 10, wherein the plurality of applications are executed by a host system.

17. The system of claim 10, wherein a host bus adapter generates AENs in response to certain pre-defined events.

18. The system of claim 10, wherein a network adapter generates AENs in response to certain pre-programmed events.

19. A system for sharing asynchronous event notifications (AENs) amongst a plurality of applications, comprising:
    an adapter that generates AENs after detecting certain events, the AENs including a version number indicative of the data structure of the AENs;
    an adapter device driver to receive the generated AENs and store the generated AENs in a memory buffer;
    a plurality of applications that are configured to selectively access the memory buffer and a shared memory where AENs are stored, each of the applications having a local memory to store an AEN sequence number;
    one of the plurality of applications:
        (i) compares the AEN sequence number of the AEN stored in the shared memory with the AEN sequence number stored in the local memory of the application;
        (ii) acquires the AEN from the shared memory, if the sequence number of the AEN in the local memory is different from the sequence number of the AEN in the shared memory;
        (iii) determines if a version number of the AEN is current; and
        (iv) generates an AEN if the version number is not current and stores the generated AEN in the shared memory, wherein the generated AEN indicates to other applications to update AEN version numbers.

20. The system of claim 19, wherein if the sequence number of the AEN in shared memory and the sequence number for the AEN in local memory is same, then, the application acquires the AEN stored in the memory buffer.

* * * * *

UNITED STATES PATENT AND TRADEMARK OFFICE
CERTIFICATE OF CORRECTION

PATENT NO. : 7,457,887 B2 Page 1 of 1
APPLICATION NO. : 11/502282
DATED : November 25, 2008
INVENTOR(S) : Christopher G. Winkler et al.

It is certified that error appears in the above-identified patent and that said Letters Patent is hereby corrected as shown below:

In column 6, line 34, in Claim 19, delete "pluralitv" and insert -- plurality --, therefor.

Signed and Sealed this

Twenty-seventh Day of April, 2010

David J. Kappos
*Director of the United States Patent and Trademark Office*